Oct. 19, 1926.
H. WYDLER
1,603,438
MEASURING AND REGISTERING APPARATUS OF VISCID FLUIDS
Filed Jan. 13, 1925    2 Sheets-Sheet 1
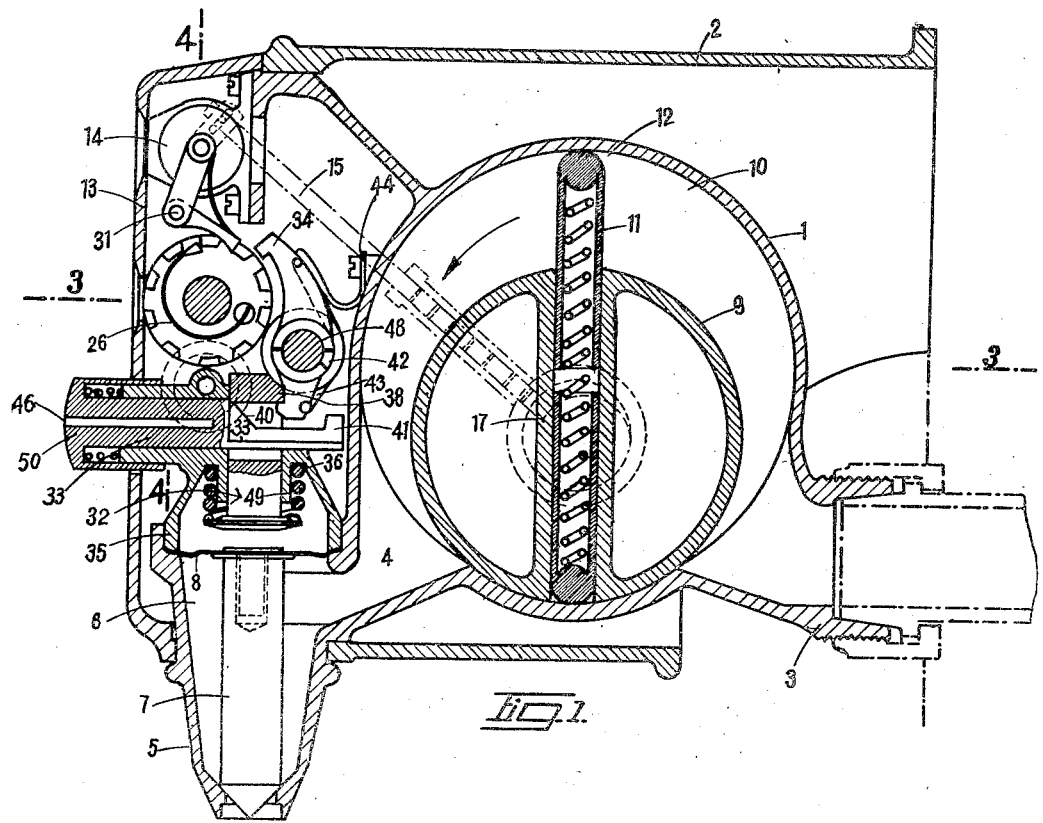
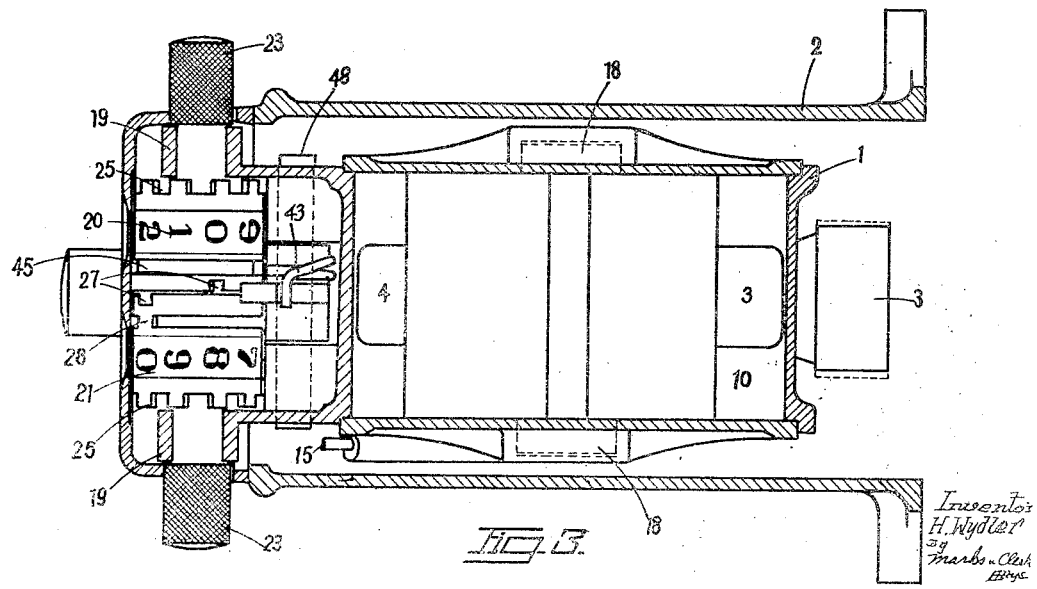

Oct. 19, 1926.  
H. WYDLER  
1,603,438  
MEASURING AND REGISTERING APPARATUS OF VISCID FLUIDS  
Filed Jan. 13, 1925  2 Sheets-Sheet 2
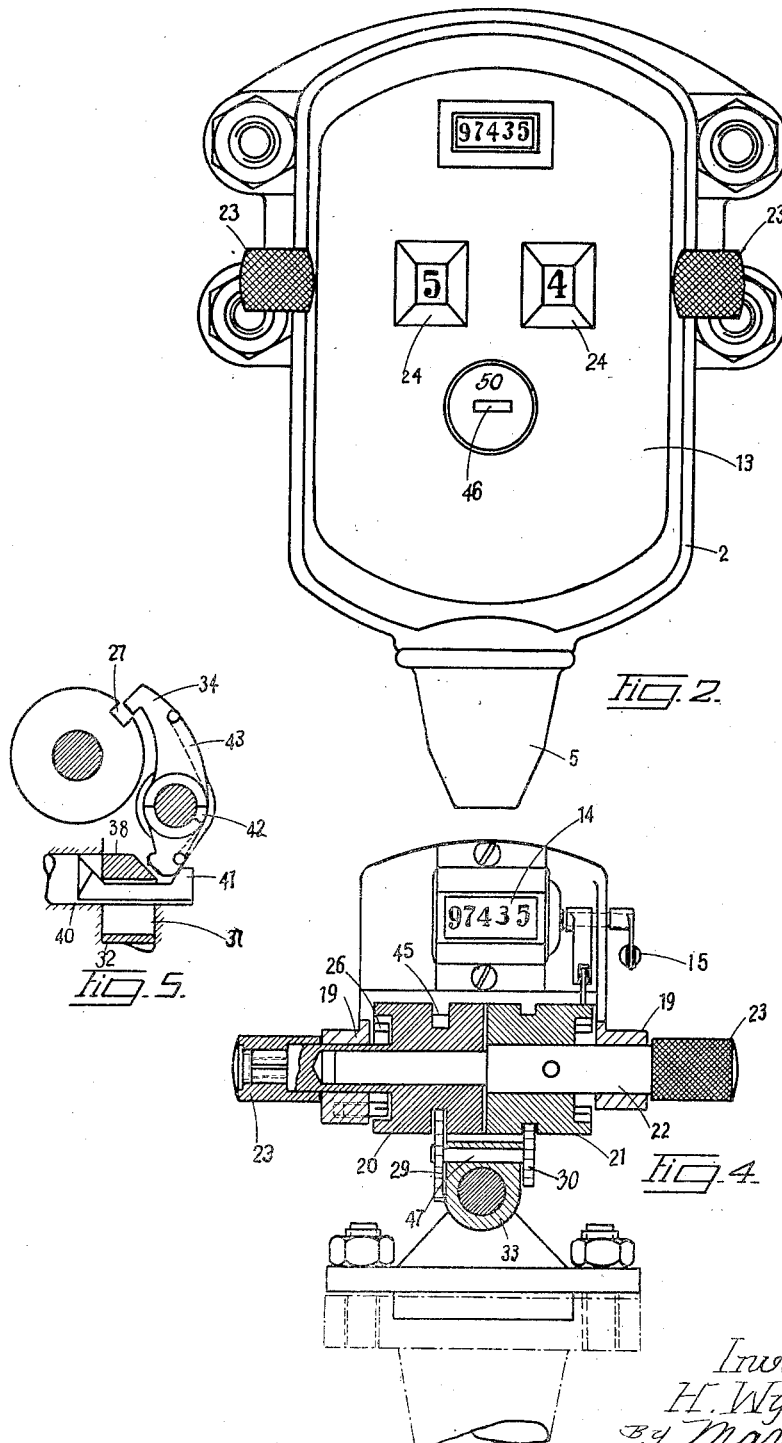

Patented Oct. 19, 1926.

1,603,438

UNITED STATES PATENT OFFICE.

HERMANN WYDLER, OF BERNE, SWITZERLAND, ASSIGNOR TO SAUSER A. G., OF SOLEURE, SWITZERLAND, A JOINT STOCK COMPANY OF SWITZERLAND.

MEASURING AND REGISTERING APPARATUS OF VISCID FLUIDS.

Application filed January 13, 1925, Serial No. 2,238, and in Switzerland January 15, 1924.

My present invention relates to improvements in measuring and registering apparatus of viscid liquids. It relates to an apparatus operated by the pressure of the liquid itself which, as in the case of inflammable liquids is generally raised by a pump or the like from a low level supply tank.

My invention consists in an apparatus comprising a rotatable piston moving within a gauged pump casing and feeding the liquid into a valve box provided with a delivery neck and confined by a diaphragm which is integral with a valve piston seated within the conical, nozzle-like outlet, while a counter operated by means of a rocking rod and a wiper on the axis of the pump piston is registering the number of fillings of the pump casing.

My invention further consists in a particular shape given to the delivery valve and adapted to prevent any liquid dropping-off loiteringly and further consists in an adjusting device whereby the quantity of liquid which has been marked on telltale drums is automatically delivered by the apparatus.

Further particulars are pointed out in the detailed description annexed to with reference to the accompanying drawings where:

Fig. 1 is a vertical longitudinal section,
Fig. 2 a front view,
Fig. 3 a horizontal section on line 3—3 of Figure 1; Fig. 4 a vertical cross-section on line 4—4 of Fig. 1 and Fig. 5 is a detail.

According to the drawing a casing 1 is lodged within a protecting outer shell 2 which may be fixed to a wall and encloses a rotary pump as a measuring device, an inlet neck 3 and a valve-box 6 being arranged above a delivery-neck 5. This valve box is communicating with the gauged pump chamber by a canal 4 and is shut off at the top by a diaphragm 8 integral with a valve-piston 7 which is arranged above said delivery neck, so as to keep it tightly closed owing to a slight bulging of said diaphragm towards said outlet. The disk-like piston 9 of the pump is mounted rotatably and eccentrically between the closely fitting side walls of a gauged, nearly spherically-shaped pump chamber 10 and is provided with a diametrically arranged slide 12, made in two halves held asunder by a spring 11 and extended sideways over the whole width of the pump chamber, so as to sweep-off cleanly all liquid adhering to the inner surfaces of said chamber and to introduce at each revolution two exactly determined volumes of liquid into the valve-box. A counter 14 imbedded within a cover 13 of the casing 1 is actuated by means of a rocking rod 15 which a spring keeps in constant contact with a wiper 17 on a trunnion 18 of the piston 9 and which at each revolution of said piston will therefore operate the counter once according to the two cut-off volumes which together amount to one unit of measure.

This described device may be employed alone as a measuring and registering device. The liquid in a supply-tank not shown is supposed to be under pressure or to be raised therefrom by any other supply device and to be fed to the apparatus. This liquid will actuate the same by lifting the diaphragm and the valve piston and will cause the delivery and the registering of the liquid.

But as it is mostly desirable in selling liquids to predetermine the quantity to be delivered a particular adjusting device has been combined with the first which device not only automatically closes again the delivery valve after the delivery of a predetermined quantity, but renders the working of the apparatus impossible without a key and prevents any malicious tampering.

Said adjusting device is mounted like the counter in the casing of the apparatus and possesses apart from a transmitting mechanism for the working of a delivery valve two telltale drums 20, 21 mounted between two brackets 19, drum 20 being marked for the larger units, for instance for liters, and the smaller drum 21 being marked for deciliters, wherefore both drums carry on their periphery the numerals 0 to 9. The drum for deciliters is fast on an axis 22 and may be turned by hand from the outside of apparatus by means of a handle 23 and the drum for liters fast on a sleeve of said axis may be turned by another handle 23. By adjusting thus the two drums the respective numerals will become visible within two windows 24 of the cover 13. The two sides of said drums facing the brackets are hollow and have toothed edges 25, ten teeth on each drum corresponding to the marked numerals 0 to 9. Brake-springs 26 are held fast on studs fixed to said brackets and engage with their rounded ends between the teeth 25 in order to prevent any accidental movement of the drums. The edges of the other side faces of said drums are interrupted by notches 27 which must be arranged so that they are in reach of the upper arm of a double pawl 34 and that both notches will register with each other when the zeros of the drums are registering with each other. The drum 21 for deciliters carries also a stop pin 28 which however stands somewhat farther off the edge than the bottom of the notch 27 and a small axis 47 is arranged underneath of said telltale drums and carries toothed wheels 29, 30 on its ends, whereof 29 gears with the toothed rim 45 of the rim 20 while the wheel 30 gears intermittingly with the stop pin 28 whenever the drum 21 is turned. The dimensions are chosen such that each turn of the drum of the deciliters turns the drum of the liters backwards for the tenth part of a revolution. The drum 21 of the deciliters is actuated from the counter 14 by means of an arm and pawl 31 provided on the axis carrying the lever of the counter which pawl 31 is engaging the teeth of the drum of deciliters. If therefore a certain quantity of liquid given in liters and deciliters is adjusted in starting from the zero position of said drums which adjusting operation has always to be effected by turning the handles backwards the counter 14 after the apparatus has been put to work will turn cylinders backwards until both windows 24 are showing again the zero. Then also the two notches 27 will register whereupon the upper arm of the double pawl 34 will engage the same. In this position of parts the predetermined quantity of liquid has passed through the gauged chamber and has flown out and therefore the delivery valve is shut at once by means of a mechanism comprising a spring 36 acting on a piston 32, a cross-bar 33 and the double pawl 34 which alternately engages into the notches 27 of the telltale drums and the head of the piston.

The double pawl 34 pivotally mounted in the casing is constituted of two arms having halved hubs arranged on a trunnion 48 so as to allow a nipper-like movement by the fact that between the two halved hubs a space 42 is left which under the effect of a torsional spring 43 is kept open. Besides this spring a slight compression spring 44 is acting on the upper arm which is to be engaged into the notches of the drums.

The Fig. 5 represents pawl 34 in its position of rest. Piston 32 is guided within a sleeve 49 inside of a cup-shaped part 35 of the casing wherein is also seated a stout helical compression spring 36 bearing against a rim on the end of piston 32. Into a slot 37 provided within said piston between the levelled head 38 and its bottom part is inserted a cross-bar 33 guided within a sleeve of the casing and carrying a pusher 50 on the outside of the cover 13 of the casing. This cross-bar has on its flattened end a levelled edge 40 and a hook 41 and is thereby adapted when pushed in from the outside to lift the piston by means of edge 40 until the lower arm of pawl 34 has caught the head 38 of the piston. Spring 36 is strong enough for pushing piston 32 downwards as soon as pawl 34 has unhooked the head 38 of said piston and strong enough also for forcing cross bar 33 back again into its normal position by means of the bevelled edge 40.

There is also a lock at 46 for locking said cross-bar 33 so that the apparatus cannot be used without a key.

The working of the apparatus is as follows:

It is supposed that the telltale drums be on zero and none of the two arms of the double pawl 34 be engaged. Therefore the space 42 will be open. It is supposed also that cross-bar 33 be in its outer position 32 in its lowest position. Then piston 32 will bear against the diaphragm 8 of the delivery valves which is closed.

It is also supposed that the liquid be supplied by gas pressure acting on its surface within a supply-tank not shown and that said pressure be switched off.

If it is desired to deliver a predetermined quantity of liquid say 5 liters plus 4 deciliters this amount can be adjusted independently from the gauging members by turning backwards on the handles 23. It is necessary to turn the drums backwards on account of the pawl of the counter. By this operation the drums 20, 21 are brought into the position as shown in Fig. 1 with regard to the double pawl 34 thereby the reciprocal position of the two arms has remained unchanged. Then the pusher 50 must be pushed in whereby the piston 32 will be lifted and caught fast by the spring-actuated lower arm of pawl 34. (Fig. 1.) The diaphragm 8 which acts as controlling member of the delivery valve 7 will not follow this movement of piston 32 but maintains the piston of said valve still in its closed position because the liquid cannot yet be supplied from the supply tank while the gas pressure remains switched off. This position of parts is shown in Fig. 1.

But if the liquid has to be delivered the gas pressure in the supply tank is switched-in whereupon the apparatus worked by the supplied liquid bulges the diaphragm and opens the valve registering also the amount of delivered liquid.

If however the amount of liquid to be delivered has not yet been adjusted the piston 32 will remain in its lowest position in contact with the diaphragm and the apparatus will not be operated even if the gas pressure has been switched-on in the tank because spring 36 is strong enough to withstand the counter pressure of the liquid. The apparatus will only begin operating if after the adjusting of the drums the knob 50 has been pushed in. Then piston 32 will be lifted by the bevelled edge 40, the lower pawl 34 which from a position in contact with the bevelled head 48 of the position (Fig. 5) will snap into a position so as to catch and maintain the piston in its upper position. But the diaphragm 8 will follow the upwards movement of the piston and will thereby open the delivery valves 7 whereupon the liquid will be discharged. This liquid will now flow out under pressure and the amount will be marked by the counter 14. This counter will cause the drums 20, 21 to be turned back until the two zeros and thereby also the two notches 27 will register so that pawl 34 snaps into the same owing to the action of spring 44. But now also the space 42 will have closed and the two arms of pawl 34 will act as one whole and relieve the catch of the lower arm with the piston head 38. Piston 32 is now abandoned to the action of spring 36 which will force the diaphragms back into its initial position and the valve-piston 7 into its closed position. Simultaneously also piston 32 will push the cross-bar to the outside and restore the position of pawl 34 as shown in Fig. 5. The required quantity of liquid has now been delivered and the initial position of parts reestablished.

Instead of a diaphragm a spring actuated piston could also be employed for controlling the delivery valve, the effect would be the same as with a diaphragm.

A main feature of this apparatus for measuring viscose liquids is that the discharge is effected by pressure and that the out flow is accelerated because there are no dead spaces where liquid is left behind and becomes resinous so as to choke up the gauged chamber and to render the measuring inexact. The discharge neck is also shaped so as to prevent any liquid dropping-off loiteringly as is usually the case with oily liquids.

Having now particularly described and ascertained the nature of my invention I declare that what I claim is:

1. In a measuring and registering apparatus for viscid liquids and in combination a liquid raising device, a forwarding and measuring device comprising a rotatable piston with radially adjustable slidable blades and arranged so as to be actuated by said liquid raising device, a gauged measuring casing having an admission and a discharge neck, a valve box joined to said discharge neck and provided with the delivery nozzle of the apparatus, a conical valve seat formed inside of said nozzle, a valve piston contacting the seat with the edges of its flat fore end and a diaphragm supporting said valve piston and confining said valve box, a wiper integral with the axis of said rotatable piston of the forwarding device, a rotatable counter and a rocking rod in contact with said wiper and arranged to feed said counter.

2. In a measuring and registering apparatus of the kind described and in combination, a valve box provided with a delivery nozzle, a forwarding and measuring device arranged so as to feed the measured liquid into said valve box, a valve seat formed inside of said nozzle, a valve piston and a diaphragm supporting said valve piston and forming part of the walls of said valve box so as to be subjected to the pressure of the liquid inside of said box, a slidable piston adapted to check the bulging of said diaphragm, a spring ready to press said check piston on said diaphragm and a hand operated pusher capable for withdrawing said piston from its contact with the diaphragm.

3. In a measuring and registering apparatus of the kind described and in combination, a forwarding and measuring device comprising a gauged casing and a rotatable piston within the same a diaphragm subject to the pressure of the measured liquid and a valve piston integral therewith and adapted to control the discharge of the measured liquid, a wiper integral with the axis of said rotatable piston of the forwarding device, a rotatable counter and a rocking rod in contact with said wiper and arranged to feed said counter, and an adjusting device arranged so as to allow to predetermine the amount of liquid to be delivered and comprising a spring-controlled, slotted, slidable piston facing said diaphragm and fit to check the bulging of the same, rotatable telltale drums having toothed edges and notches at their zero point, handles for turning said drums backwards so as to register the numerals of the desired number of measuring units on a fixed mark, an operating lever on the axis of the counter and engaged with a pawl in the teeth of the drums, a resilient pusher, having a slanting blade engaged in the slot of the check piston and adapted to uplift the check piston from contact with the diaphragm, and a double pawl between drum and check piston having a first spring-controlled pawl provided with a hook located so as to engage into said slot in the uplifted position of the check piston and a second spring-controlled pawl bearing with its hub on that of the first pawl and provided with a nose capable of dropping into the notches of the telltale drums so as to liberate the catch of the said hooked pawl and the check piston and to stop the delivery of the liquid.

In testimony whereof I affix my signature.

HERMANN WYDLER.